Feb. 11, 1947.  W. BLACKMORE  2,415,574
SEAL FOR JOURNAL BOXES
Filed Jan. 30, 1945    2 Sheets-Sheet 1

INVENTOR
WILLIAM BLACKMORE
BY
ATTORNEY

Feb. 11, 1947. W. BLACKMORE 2,415,574
SEAL FOR JOURNAL BOXES
Filed Jan. 30, 1945 2 Sheets-Sheet 2

INVENTOR
WILLIAM BLACKMORE
BY
ATTORNEY

Patented Feb. 11, 1947

2,415,574

UNITED STATES PATENT OFFICE 2,415,574

SEAL FOR JOURNAL BOXES

William Blackmore, Cleveland Heights, Ohio, assignor to National Malleable and Steel Castings Company, Cleveland, Ohio, a corporation of Ohio Application January 30, 1945, Serial No. 575,213

5 Claims. (Cl. 286—5)

1

This invention relates to a construction for use in a railway car truck, and more particularly, to means for preventing the entrance of dust, cinders and moisture into the journal box.

An object of this invention is to provide a sealing means which prevents the entrance of materials such as dust and other foreign materials into a journal box and which involves no wearing parts.

A further object of this invention is to provide for the elimination of the present dust guard used in conventional journal boxes.

A more particular object of this invention is the provision of attachable means which not only deflects materials, such as dust and water, away from the journal box, while the railway car is in motion, but which also prevents the entrance of such materials, and particularly water, into the journal box while the car is stationary.

In conventional journal boxes a dust guard is used surrounding the journal for the purpose of sealing the rear end of the journal box against the entrance of dirt, cinders and water. Dust guards, because of their contact with the moving journal, are subject to wear and soon become ineffective and require periodic renewal.

In accordance with this invention, a dust seal is provided which prevents dust, cinders, water and other materials from entering into the journal box, whereby the life of the bearing and journal is prolonged because the oil and waste contained in the box are kept in a much cleaner condition. The dust seal is desirably attached to the journal box by welding or brazing and when so attached eliminates the necessity for using the conventional dust guard.

The dust seal of this invention comprises a housing extending from the journal box toward the associated wheel and surrounding the hub of the wheel with only sufficient clearance to provide for the normal variation in hub sizes and for the various movements of the wheel and axle relative to the journal box. This housing is so formed that cinders, dirt, moisture and other oil contaminating materials striking it while the car is in motion are deflected away from the wheel so that such materials do not enter between the housing and the hub of the wheel. The structure of the housing is such that when the car is stationary and dirt or moisture drips down from the car body or from the wheel, such material is deflected so that it does not enter the journal box.

Actual road service tests in one embodiment of this invention have shown that only one-fourth as much dirt and moisture enters the journal box

2 equipped with this invention as enters journal boxes running under the same car but equipped with the conventional type of dust guard.

A more comprehensive understanding of this invention is obtained by reference to the accompanying drawings in which.

Figures 1, 2:
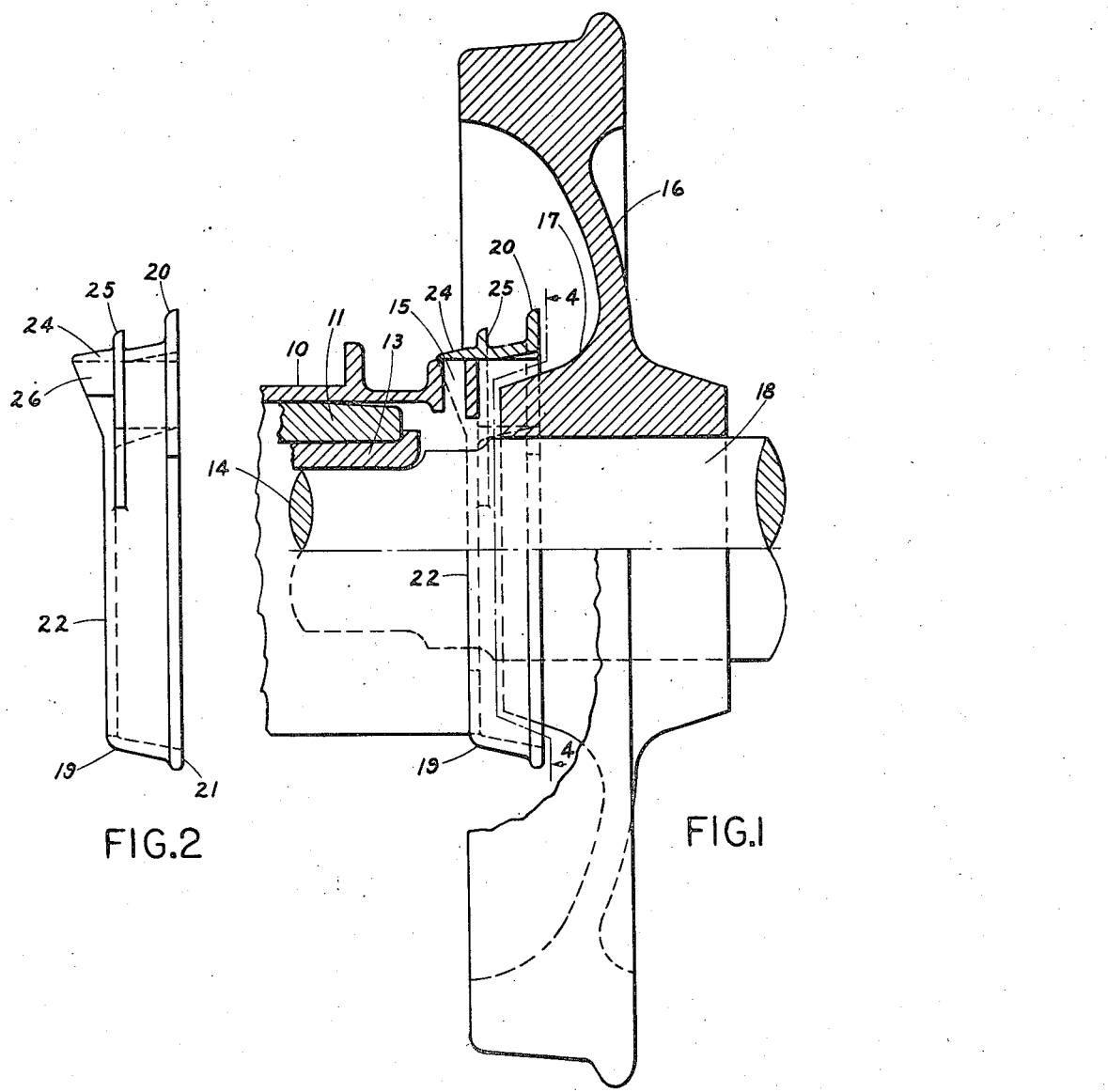
Fig. 1 is an elevation, partly in section, of an embodiment of this invention.
Fig. 2 is an elevation of the dust seal shown in Fig. 1.
Figure 3:
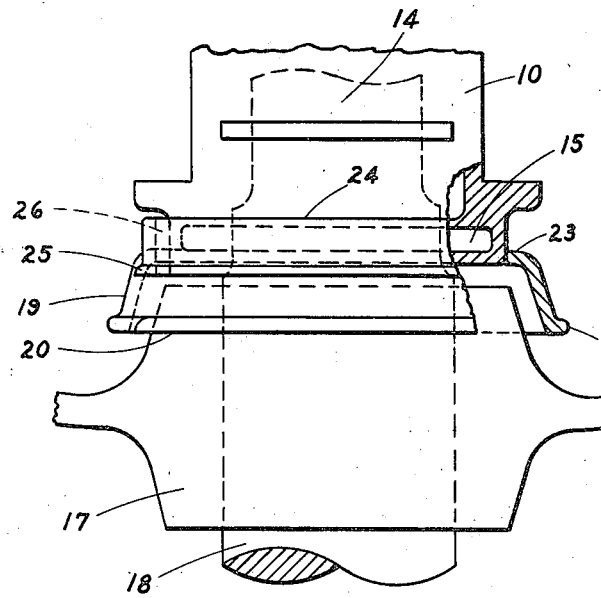
Fig. 3 is a plan view, partly in section, of the embodiment shown in Fig. 1.

Referring to the drawings in which like reference numerals indicate like parts, the numeral 10 represents a portion of a conventional journal box containing a wedge 11 and a brass 13 resting on a journal 14. The journal box includes the usual dust guard slot or well 15, but in this embodiment of the invention no dust guard of the usual type is used. A wheel 16 is mounted on an axle 18 in the usual manner and has the usual hub portion 17 extending toward the journal box.

Figure 4:
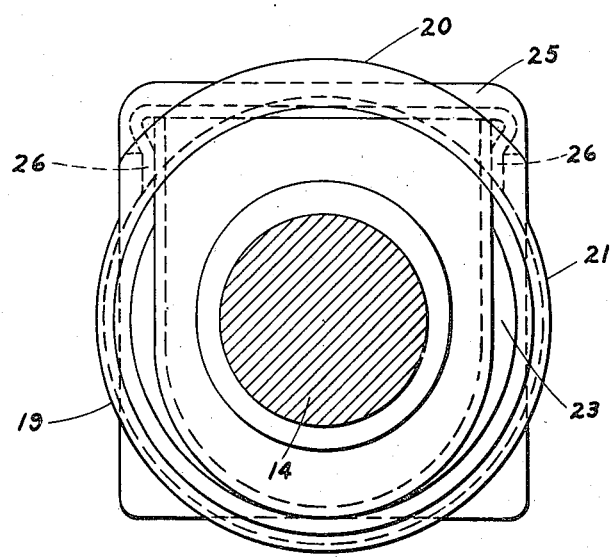
Fig. 4 is an elevation along the lines 4—4 shown in Fig. 1.

A dust seal 19 is secured to the end of the journal box adjacent the wheel and extends in a general conical shape toward the wheel, surrounding and overlapping the adjacent part of the wheel hub 17. This conical portion of the dust seal housing is made a relatively close fit about the wheel hub, sufficient clearance being allowed to provide for the normal variations in wheel hub diameter and to allow for the lateral and radial movements of the wheel hub relative to the journal box which occur in service. Across the upper part of the dust seal housing and on the side toward the wheel is a relatively deep flange or fin 20 which preferably extends radially outward from the body of the housing. As particularly shown in Fig. 4, this flange 20 extends around the top portion of the periphery of the dust seal housing 19 and partly down the sides thereof. It is seen therefore that the flange 20 extends over that part of the housing against which dust, cinders or water may fall due to dripping from the car structure. This flange 20, when the car is stationary, serves to deflect away from the wheel and toward the body of the journal box dirt or water which may fall upon it from the wheel or from the car body. When the car is in motion and dirt or water is blown against the housing, the flange 20 deflects the stream of air carrying dirt or moisture away from the wheel, thus preventing the entrance of the contaminating material between the housing and the wheel hub. It has been found satisfactory to make the lateral extent of the flange 20 about equal to that of the journal box, although this particular dimension may be varied within reasonable limits. Farther down on the sides of the housing and around the bottom thereof, the flange 20 diminishes in depth until it appears as a shallow flange or bead 21.

A side 22 of the housing adjacent the journal box is formed with an inwardly extending flange 23 made to conform to the exterior shape of the journal box and to surround closely the journal box. Extending toward the journal box from the upper portion of the housing is a horizontal supporting and sealing flange 24 which when the housing is in place on the journal box rests on the top of the journal box to support the housing and extends across the upper opening of the dust guard slot and thus serves to seal off the dust guard slot from the entrance of dirt or moisture.

An additional vertical flange or fin 25 is formed across the top of the housing in a plane parallel to the plane of the flange 20 so as to form with the flange 20 a channel, trough or gutter whereby dirt or moisture deflected by flange 20 is caught by the trough and carried down the sides of the housing. It will be observed from Fig. 4 that flange 25 extends above flange 20 toward the sides of the journal box. Any water dripping from above onto flange 24 and tending to splash toward the wheel will be intercepted by flange 25 and prevented from reaching a point where it can enter the box. If desired, the horizontal flange 24 may be extended a short distance down over the sides of the journal box, as shown at 26, thus conforming to the shape of that portion of the journal box upon which its rests and serving also to reinforce the supporting flange 24.

The dust seal of this invention may be easily attached to a conventional journal box such as that equipped with a dust guard well. If the dust seal is attached by welding or brazing and an imperfect fit results, substantially no dust, water or other materials enter the dust guard well since such materials are collected and removed by the channel formed by the flanges 20 and 25.

The dust seal of this invention is extremely efficient in preventing the entrance of dust, water and other materials into the journal box. As has heretofore been noted, actual road tests in one embodiment have shown that only one-quarter as much dirt and moisture enters the journal box equipped with this invention as that which passes to the journal box equipped with the conventional type of dust guard. The net result effected by the use of this invention is a material reduction in the wear of the journal and brass and the prevention of hot boxes.

The terms and expressions which are employed herein are used as terms of description and not of limitation, and there is no intention in the use of such terms and expressions of excluding any mechanical equivalents of the features shown and described or portions thereof, but it is recognized that various structural modifications are possible within the scope of the invention claimed.

What I claim is:

1. A dust deflecting device adapted for attachment to the rear of a railway type journal box comprising a housing circular in cross section extending away from said journal box toward an associated wheel over the hub thereof, said housing having a flange of substantial depth extending outwardly from the wheel-adjacent portion across the top thereof and continuing down the sides thereof with diminishing depth and a horizontal flange extending toward said journal box to form a support for said device and to form a closure for the dust guard slot of said journal box.

2. A dust deflecting device adapted for attachment to the rear of a railway type journal box comprising a housing circular in cross section extending away from said journal box toward an associated wheel over the hub thereof, said housing having a flange of substantial depth extending outwardly from the wheel-adjacent portion across the top thereof and continuing down the sides thereof with diminishing depth, a channel to collect and deflect materials away from said journal box and a horizontal flange extending toward said journal box to form a support for said device and to form a closure for the dust guard slot of said journal box.

3. A journal box having a housing extending rearwardly thereof and in overlapping relation to the hub of an associated wheel, said housing having a flange of substantial depth extending outwardly from the wheel-adjacent portion across the top thereof and continuing down the sides thereof with diminishing depth, a channel to collect and deflect materials away from said journal box and a horizontal flange extending toward said journal box to form a support for said housing and to form a closure for the dust guard slot of said journal box.

4. A dust deflecting device adapted for attachment to the rear of a railway type journal box comprising a conical housing extending away from said journal box toward an associated wheel over the hub thereof, said housing having a first vertical flange of substantial depth extending outwardly from the wheel-adjacent portion across the top thereof, a horizontal flange extending toward said journal box to form a support for said device and to form a closure for the dust guard slot of said journal box, and a second vertical flange forming with said first vertical flange and said horizontal flange a channel to collect and deflect materials away from said journal box.

5. A dust deflecting device adapted for attachment to the rear of a railway type journal box comprising a housing circular in cross section extending away from said journal box toward and associated wheel and closely surrounding the hub thereof, said housing having a flange of substantial depth extending outwardly from the wheel-adjacent portion across the top thereof and continuing down the sides thereof with diminishing depth, and a horizontal flange extending from the upper portion of said housing and overlapping the end of said box to form a support for said device.

WILLIAM BLACKMORE.

REFERENCES CITED

The following references are of record in the file of this patent:

UNITED STATES PATENTS

| Number | Name | Date |
|---|---|---|
| 887,831 | Muth | May 19, 1908 |
| 2,160,778 | Dall, et al. | May 30, 1939 |
| 2,227,903 | Harger | Jan. 7, 1941 |

FOREIGN PATENTS

| Number | Country | Date |
|---|---|---|
| 767,418 | French | of 1934 |